United States Patent

[11] 3,599,188

[72] Inventors James M. Donnelly
Carol Stream, Ill.;
Kenneth E. Larabee, Waseca, Minn.;
Bernard J. Rekiere, Addison, Ill.

[21] Appl. No. 860,141
[22] Filed Aug. 18, 1969
[45] Patented Aug. 10, 1971
[73] Assignee GTE Automatic Electric Laboratories Incorporated
Northlake, Ill.
Continuation of application Ser. No. 379,941, July 2, 1964, now abandoned.

[54] SOLENOID ARRAY MEMORY HAVING BIPOLAR OUTPUT SIGNALS
5 Claims, 8 Drawing Figs.

[52] U.S. Cl. .......... 340/174 SP, 340/174 M, 340/174 AC, 340/174 QB, 340/174 NC, 340/174 WA

[51] Int. Cl. .......... G11c 11/04, G11c 17/00

[50] Field of Search .......... 340/174 M

[56] References Cited

UNITED STATES PATENTS

| | | | |
|---|---|---|---|
| 3,284,781 | 11/1966 | Takahashi .......... | 340/173 |
| 3,295,110 | 12/1966 | Brick et al. .......... | 340/172.5 |

*Primary Examiner*—James W. Moffitt
*Attorneys*—Spencer E. Olson, Olson K. Mullerheim, B. E. Franz and J. T. Whitesel

ABSTRACT: Card changeable read only solenoid array memory systems employ printed data planes as the storage medium. In one system the data planes are connected to and directly energized by word drivers, while a second system employs solenoid driven connectionless planes. The printed conductors of the data planes partially encircle the sensing solenoids in a clockwise or counterclockwise direction to store binary coded data and provide bipolar output signals.

INVENTORS
James M. Donnelly
Kenneth E. Larabee
Bernard J. Rekiere
BY
ATTY.

SOLENOID ARRAY MEMORY HAVING BIPOLAR OUTPUT SIGNALS

This is a continuation of our patent application Ser. No. 379,941 filed July 2, 1964 and now abandoned.

This invention relates to solenoid array memory systems and in particular to mechanically alterable semipermanent memory systems and components thereof.

Semipermanent memories find particular use in association with operating systems which from time to time require changes in the stored data. Electrically alterable memory techniques may be employed for this purpose; however, due to the cost of associated electronics to perform these alterations, electrically alterable techniques are best employed where the frequency of information change is relatively high, for example when daily or continuous information changes are made.

A low frequency of information change is better handled by mechanically alterable techniques. Generally, the mechanically alterable techniques involve replacing code cares or code strips with ones containing new data. These cards or strips carry permanent magnets or ferrite plugs in the case of some twistor or inductive cross-point memories, respectively. Other types of twistor and cross-point memories utilize a conductive code card with apertures therein. The well-known flying spot store employs a raster of clear and opaque areas.

The type of memory system with which the present invention is most concerned employs a plurality of stacked data planes having an array of aligned apertures therein to receive a corresponding array of elongated solenoids therethrough. I. R. Butcher in his article "A Prewired Storage Unit," published in the Apr. 1964 issue of the IEEE Transactions on Electronic Computers, Vol. EC–13, No. 2, describes this type of memory system wherein a multiplicity of wires are selectively threaded around bobbins on each of the data planes. A data word is changed by threading another winding around the bobbin.

George G. Pick, in this patent application "Electronic Data Processing," Ser. No. 163,451, filed Jan. 2, 1962, and now abandoned, describes a pattern recognition system that employs an array of elongated solenoids which extend through a plurality of planes. Each of the planes have a character pattern coded thereon by a winding which loops each of the solenoids in a clockwise or counterclockwise direction from one to $n$ number of times to obtain positive and negative signal transfer of various magnitudes from the individual solenoids to the windings. There is also provided a printed circuit technique requiring two memory cards for each pattern; the same weighted results are achieved by winding each of the various solenoids with a different number of turns.

The present invention is an improvement over the above-mentioned memory and data processing systems in that all bits of a data word or of several data words may be stored on a single data plane by utilizing printed circuit techniques. To change a word requires only that a data plane be replaced. Furthermore, because of the printed circuit configuration, the stored information is retrieved from each data plane of the information store in the form of useable bipolar output signals.

An object of the invention is to provide an improved memory system.

Another object of the invention is to provide a semipermanent information store in which the information content is easily altered by mechanical techniques.

A particular object of the invention is to provide a memory system having output signals of an essentially infinite binary ONE to ZERO ratio.

A feature of the invention resides in the use of an array of elongated solenoids which extend through a plurality of memory planes, each of these memory planes having a bipolar coded conductive circuit printed thereon which is inductively linked to each of the solenoids. The conductive circuits are connected to energizing apparatus and are selectively energized thereby to effect signal transfer from the coded strip to the individual solenoids.

An embodiment of the invention uses connectionless memory planes. An additional array of drive solenoids extend through and are individually inductively coupled to the memory planes so that selective energization of a drive solenoid energized only one of the conductive circuits of the memory planes.

A particular feature of the invention resides in the printed circuit configuration on the memory planes which provides bipolar output signals. The circuits are printed so as to individually encircle the sense solenoids. The individual encirclements are then selectively coded to store either of the binary digits by rupturing the printed circuit on one side or the other of each sense solenoid. A memory plane or code card having a new information pattern may be easily substituted for a code card in the memory to alter the stored information.

Other objects and features of the invention not specified above will become apparent and the invention will be best understood by reference to the following description and the accompanying drawings.

GENERAL DESCRIPTION

The invention is illustrated herein in two embodiments, one which selectively accesses a plurality of memory planes via a corresponding plurality of solenoids, and one which has directly driven connected memory planes.

Figure 1:
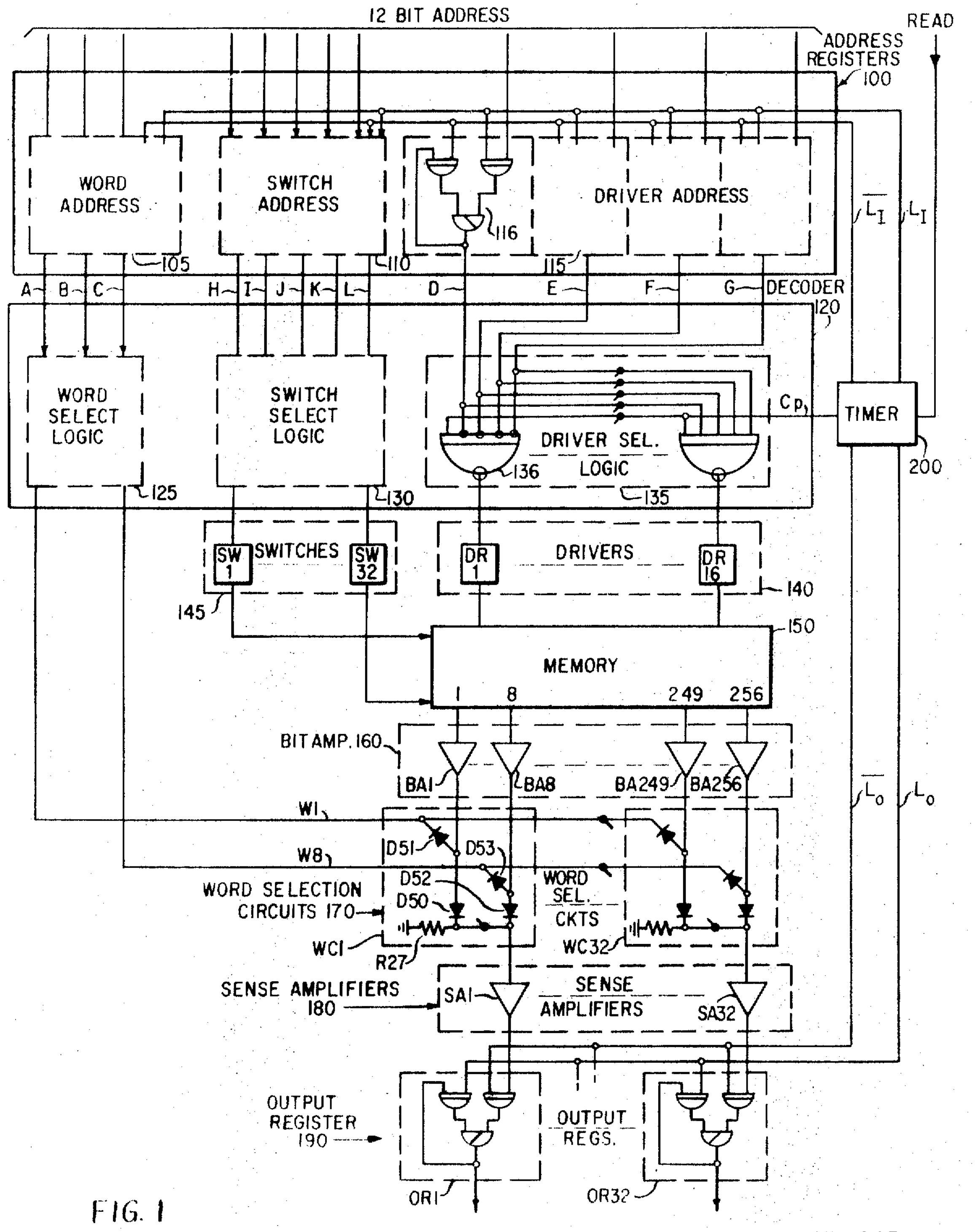
FIG. 1 is a functional block diagram of a directly driven (connected card type) semipermanent memory system employing the principles of the present invention.

FIG. 1 describes a memory system comprising an address register 100 for accepting from an associated system (not shown) the location of a word in the memory 150. The particular location is in the form of a coded address which is donated by input address characters A through L. The selected word position is decoded by the word select logic 125, the driver select logic 135 and the switch select logic 130. The word select logic 125 controls the word selection circuits 170 to preselect the correct word position on each memory plane. The driver select logic 135 and the switch select logic 130 then enable one driver and one switch combination to access the correct memory plane. The bit amplifiers 160 act as preamplifiers to build up the output signals from the memory so that accurate signal discrimination may occur in the word selection circuits 170 and sensing of the selected signals may be accomplished by the sense amplifiers 180. The sensed signals are then passed to the output register 190 for utilization by the associated or another machine system.

The reading process is initiated by a READ control signal which is accepted from the associated machine by the timer 200. The timer then controls the reading process by controlling the address register, the driver select logic and the output register.

Figure 2:
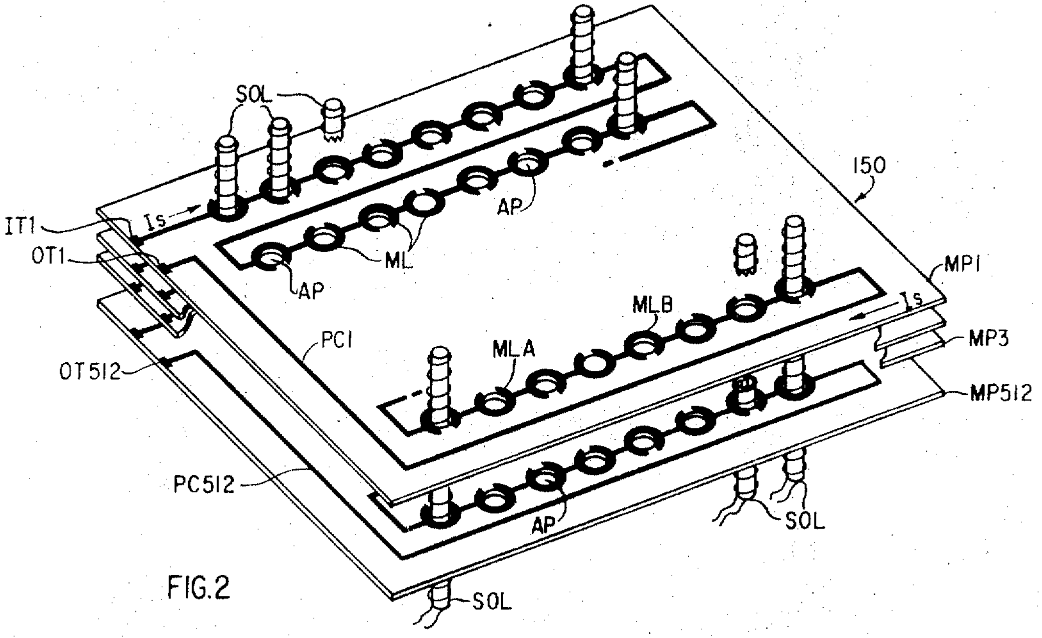
FIG. 2 is a schematic representation of a semipermanent information store according to the present invention.
Figure 3:
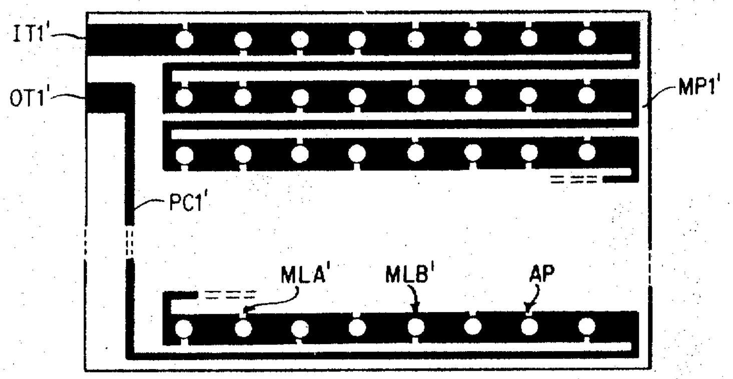
FIG. 3 is a plan view of a memory plane which may be employed in the arrangement of FIG. 2.
Figure 4:
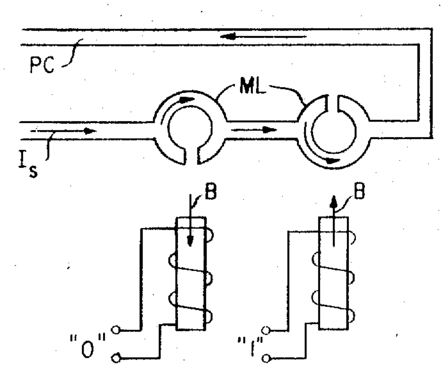
fig. 4 is a representation of a portion of a memory plane to aid in understanding the invention, particularly the feature of bipolar outputs signals.

FIG. 2 describes the memory 150 of FIG. 1. A plurality of memory planes MP1—MP512 with an array of aligned apertures AP therein are placed over a corresponding array of elongated solenoids SOL. To change a particular word means only replacing the plane containing that word with a new plane of different information content. Of particular interest are the conductive strips PC1—PC512. Each of these conductors, printed on a flexible substrate, are formed in part by a series of loops ML which encircle each of the solenoids. Selective removal of the printed conductor on either side of the solenoids will cause a current traversing the plane from terminal IT to terminal OT, to partially encircle the solenoids in corresponding clockwise and counterclockwise directions. FIG. 3 describes a similar memory plane 320 which requires simpler art work construction, but which functions the same as the planes of FIG. 2.

Figure 5:
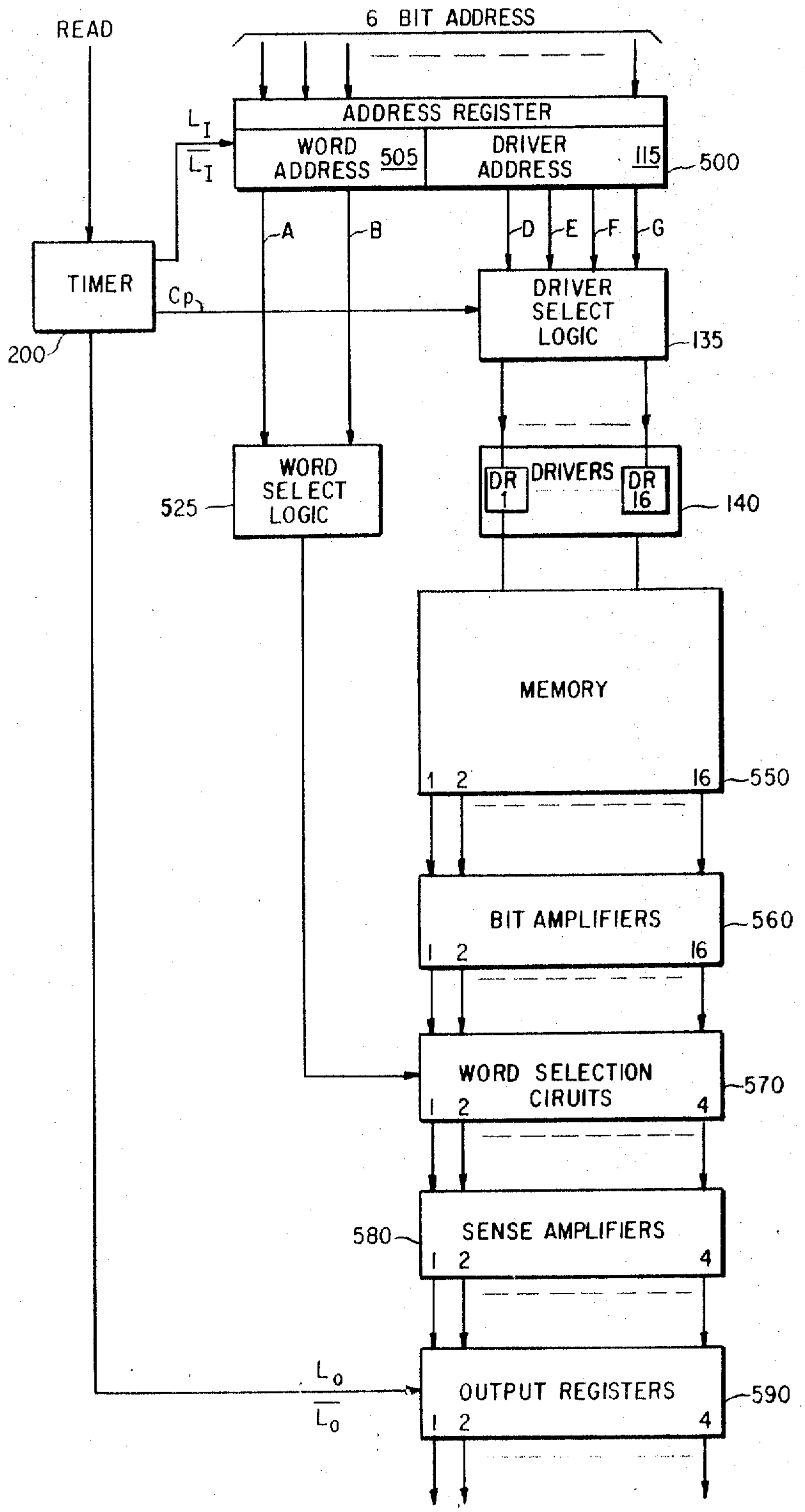
FIG. 5 is a functional block diagram of a connectionless card type memory system according to the principles of the invention.
Figure 6:
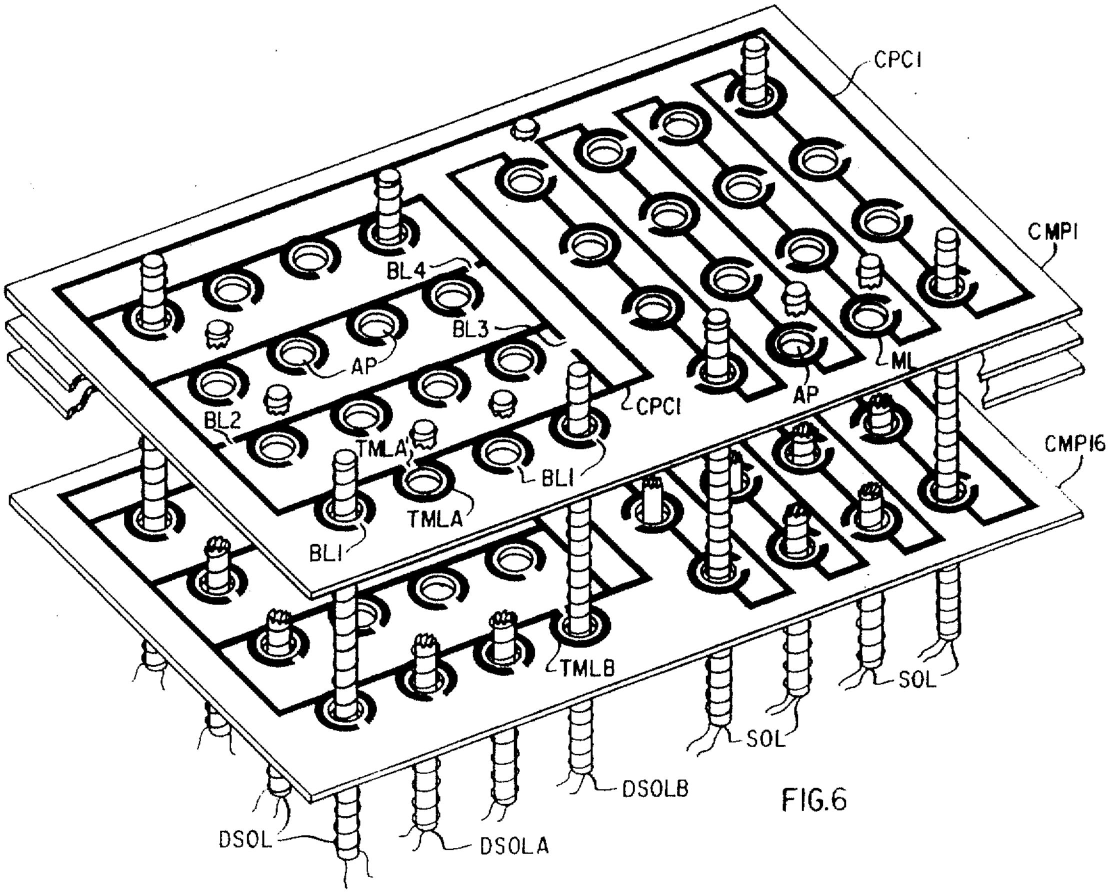
FIG. 6 is a schematic representation of another semipermanent information store.

FIG. 5 describes a memory system that is similar to that of FIG. 1, but which employs connectionless memory planes. In FIG. 5 one will notice that no switches are required and therefore no switch address and decoding is provided. Actually FIG. 6 better describes differences between the system of FIGS. 1 and 5. In FIG. 6 there is a plurality of memory planes CMP1—CMP16 having an array of aligned apertures AP therein. Two groups of solenoids SOL, DSOL form a solenoid array which extends through the aligned apertures. Solenoids SOL are, as before, the sense solenoids. Solenoids DSOL are the drive solenoids. The printed circuit in the sensing section of the information store is the same as that illustrated in FIG. 2. The driving section on each plane, for example CMP1, now adds a series-parallel arrangement of loops in series with the main of the conductive strip CPC1; however, only one of these additional loops forms a portion of the endless series circuit as will be explained below.

Figure 8:
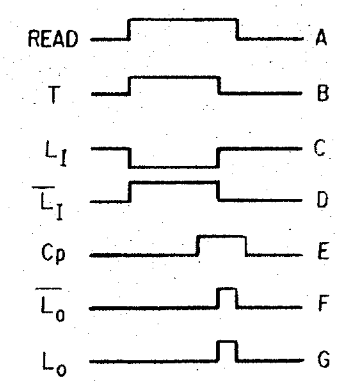
FIG. 8 is a timing diagram for the timer of FIG. 7.
Figure 7:
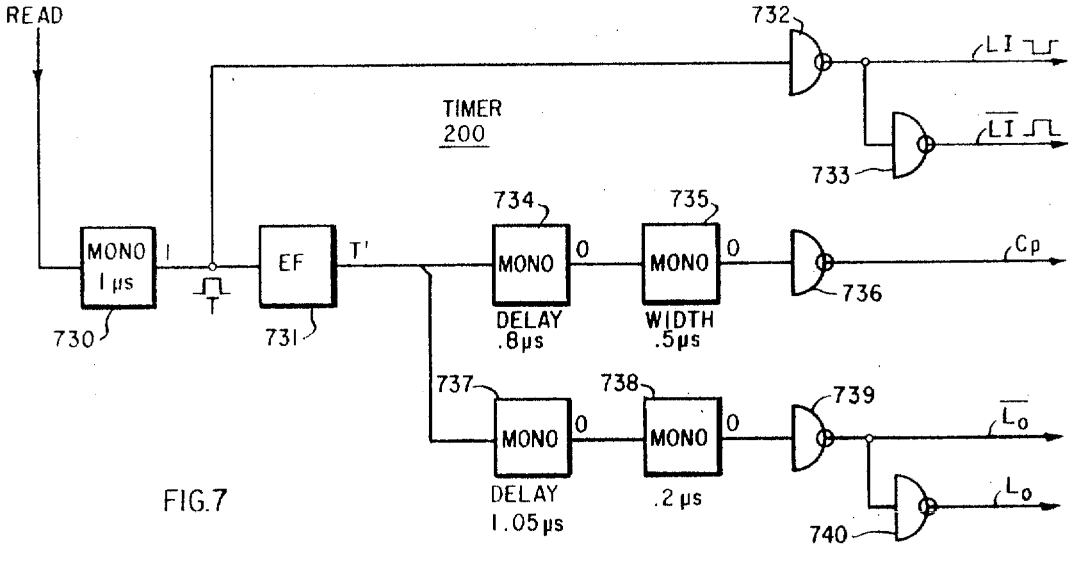
FIG. 7 is a block diagram of the timer of FIGS. 1 and 5.

FIG. 7 shows the timer 200 as comprising: a series of monostable multivibrators 730, 734, 735, 737 and 738; an emitter follower 731; and inverters 732, 733, 736, 739 and 740 to furnish the control pulses $L_i$, $\overline{L}_i$, $C_p$, $L_o$ and $\overline{L}_o$. FIG. 8 is a timing diagram of the system control pulses.

DETAILED DESCRIPTION

The foregoing and the remainder of the figures will be more completely described by a description of their components and by the description of operation. Reference numerals for the same apparatus such as the timer 200 have been carried throughout the specification. Similar apparatus such as registers 100 and 500 have similar reference numerals of a hundred series according to their particular location in the drawings. Other components have been referenced according to their characteristics or functions, such as diode D50 and sense amplifier SA1.

ADDRESS REGISTER (FIGS. 1 & 5)

The address register 100 of FIG. 1 has three portions, while the address register of FIG. 5 has only two portions. This difference will be easily understood from the operational description of the invention; briefly through, fewer input address bits are required for a connectionless card memory than a memory having similar cards which are directly driven. However, to enjoy the same capacity, the connectionless card memory would require many more drive solenoids and address characters. In general, the outputs of the address register latch to the condition of the corresponding inputs upon the occurrence of the control pulse $L_i$.

Word Address Register—105,505

The word address portion of the address register provides coded outputs under the control of pulse $L_i$ which are representative of the word position on a card; in this illustrated case one out of four or one out of eight words of each memory plane.

Driver Address Register—115

The portion of the address register which provides the coded outputs upon the occurrence of pulse $L_i$ representing a particular driver is the driver address register. In the case of a connectionless card memory system (FIGS. 5 & 6), the output code represents the selected memory plane. In the case of directly driven card memory system (FIG. 1), this output code is only a partial representation of the selected memory plane.

Switch Address Register—110

The switch address register is only used in the case of connected, directly driven memory planes. The outputs due to pulse $L_i$ represent the remainder of the memory plane selection.

Address Register Circuits

The address register may employ any of several well-known configurations. Because of the particular timing involved in the illustrated embodiments, latching circuits, see 116, are employed whereby the outputs of the register latch to the condition of the inputs when the latching-in pulse $L_i$ is received. An experimental system of the type illustrated employed two AND logic gates, an OR logic gate, and two inverters in a sequential logic configuration to realize the register for each address character. Since this type of logic is well known, no further discussion thereof is deemed necessary herein.

ADDRESS DECODING LOGIC (FIGS. 1 & 5)

To select for example one out of eight, 16, and 32, words, drivers and switches, respectively, is the function of the decoding logic 120. Like the address register, the decoding logic has two, or three sections as the case may be.

Word Select Logic—125,525

As the name implies, the particular selected word address from the address register 100 or 500 is decoded by the word select logic. The resulting outputs are transmitted to the output end of the memory to control word selection from the outputs of a memory plane which is to be accessed.

Driver Select Logic—135

The selection of one out of 16 drivers, DR1–DR16 is accomplished through the intermediary of the driver select logic. The output of this stage of the system selectively enables one of the drivers. In the case of the connectionless card memory stack, selection of a driver provides the entire memory plane selection, as previously indicated.

Switch Select Logic—130

In the connected card embodiment herein it has been provided that one driver may energize more than one card. Therefore, additional address bits and decoding of the same is required. The switch select logic 130 is provided to complete the selection required by decoding the output of the switch address register to enable a selected switch.

Logic Circuitry—136

The logic circuits employed in our experimental system were of the conventional NAND or inverted AND type; however any suitable logic could be employed. In addition to the code inputs from the driver address register, the logic gates of the driver select logic each have an input $C_p$ to enable the logic and hence select a driver at the proper time. This will be explained in the timer section below and in the operational description.

AMPLIFIERS (FIGS. 1 & 5)

Bit Amplifiers—160

Conventional amplifier circuits were used in our experimental system. The following is offered to better describe the system. Bit amplifiers are employed to detect all the bits of a selected memory plane before selection of a word occurs. Some of the outputs of the bit amplifiers are selected by the word select circuits under the control of the word select logic.

Sense Amplifiers—180

The sense amplifiers detect the bit signals of a selected word in preparation for temporary storage in the output register 190.

Word Selection Circuit—170 (WC1)

The word selection circuit is interposed between the bit amplifiers 160 and the sense amplifiers 180. These circuits in an experimental memory were actually integrated as a part of the bit amplifier circuits. Word selection is a gating arrangement under the control of the word selection logic and inhibits the transfer of unselected data from the bit amplifiers to the sense amplifiers.

In FIG. 1 there is shown a word selection circuit WC1 connected to the output of the bit amplifier BA1. All bits, say all bits designated bit one of each word on the same card, are connected via diodes such as D50 and D52 to resistance R27. Also the outputs are connected to the word select logic via diodes such as D51 and D53. The word select logic provides potentials to forward bias the diodes (such as D51) of the unselected word bits and essentially short out the output signals. The selected word bits however receive signals to back bias these diodes and forward bias diodes such as D50 to develop a signal across resistance R27 which is connected to a sense amplifier (SA1 in this illustration).

OUTPUT REGISTER (FIGS. 1 & 5)

The output register is essentially the same as the address register. Signals received from the sense amplifiers are registered here. Like the address register, the input conditions of the output register are latched at the output thereof only upon receipt of a latching pulse in this case pulse $L_o$.

TIMER (FIGS. 7 & 8)

The timer, under the control of a READ or start signal from the system employing the memory, provides the aforementioned pulses $L_l$, $C_p$ and $L_0$. This apparatus comprises a series of monostable multivibrators to generate and shape timed pulses.

The timer comprises a monostable multivibrator 730 which accepts a READ signal (Trace A, FIG. 8) from the associated machine and operates to produce a 1.0 microsecond pulse T (Trace B, FIG. 8). This pulse is amplified and inverted by circuits 732 and 733 to provide timing pulses $L_l$ and $\overline{L}_l$ (Traces C & D, FIG. 8).

Pulse T is coupled to a second monostable circuit 734 by an emitter follower 731. The monostable multivibrators 734 and 735 and inverter 736 regenerate pulse T as pulse $C_p$ (Trace E, FIG. 8) of 0.5 microsecond width and delayed 0.8 microseconds.

The emitter follower 731 also couples pulse T to a series of two multivibrators 737,738 and two inverters 739,740 which regenerate pulse T as pulses $L_o$ and $\overline{L}_o$ (Traces F & G, FIG. 8) of 0.2 microsecond width and delayed 1.05 microseconds. The complete reading cycle is therefore in the order of 2 microseconds which is the time for the completion of each $C_p$ pulse and the recovery time of the amplifiers.

ENERGIZING APPARATUS (FIGS. 1 & 5)

The energizing apparatus may take several forms. Two are discussed below in connection with the directly driven connected card type memory and the connectionless card type memory.

Drivers—140

The drivers of the system described herein may be of conventional design to provide 300 milliampere pulses of current, preferably in a ramp wave so that differentiation thereof by the memory solenoids produces a square wave.

Switches—145 (FIG. 1)

Conventional switch circuitry is employed in the case of connected cards to provide a complete energization current path from a selected driver via a selected memory plane.

MEMORY APPARATUS (FIGS. 2, 3, 4 & 6)

The memory apparatus of the invention, as described herein, comprises a plurality of memory planes or cards. Each of these cards has an array of apertures therein for accepting an array of elongated solenoids therethrough. Each of these memory planes has a conductive series circuit printed therein (hereinafter called a major loop PC, CPC) which encircles and is inductively coupled to each of the solenoids (hereinafter called a minor loop ML). This series circuit acts as a transmission path for driver currents or currents derived therefrom. As will be seen hereinafter, one type of memory apparatus has its solenoid array and corresponding portions of the series circuits divided into two portions—a driver group, and a sense group. The function and coding of these groups is explained immediately below.

CARD CODING

As just stated, one type of memory apparatus is divided into a driving group and a sensing group. The other type described has only a sensing group; therefore, the information storage section of a card will be first explained.

Information Storage Coding (FIGS. 2, 3, 4 & 6)

The information storage section of a card is inscribed with the data bits of several words in binary form. For example, in FIG. 2, a binary ONE signal transfer from card to sense solenoid requires that the associated minor loop MLB of the series circuit PC1 encircle that solenoid in a direction so as to include that solenoid within the major loop, and a binary ZERO signal transfer calls for an encirclement by the minor loop MLA so as to exclude that solenoid from the major loop PC1. Therefore, a signal current is traversing the series circuit of a card, which encircles a solenoid in one direction to transfer a one and in the opposite direction to transfer a zero. The same is true in FIG. 3. This can be best seen by reference to FIG. 4 of the drawings and to the operational description. The actual coding of the memory planes is accomplished by selectively removing portions of the printed circuit by scraping or punching through the printed circuit.

Access Coding (FIG. 6)

Access coding is only used when the memory is of the connectionless card type. In such a memory each card had the aforementioned driving section. In the drive section of a card the minor loops TML are joined to the major loop CPC in a tangent-type configuration. Removal of a section of the printed circuit at such a junction effects a signal transfer from an energized solenoid to the major loop; such a conductor removal at an opposite point of a minor loop will not provide such a signal transfer. Therefore, only one minor loop per plane encircles a drive solenoid and only one plane is associated with any one drive solenoid.

In FIG. 6 only one drive solenoid DSOLA is included in the major loop CPC1; that one being encircled by minor loop TMLA. Similarly, loop TMLB is the only loop which includes a drive solenoid DSOLB within the conductive loop of memory plane CMP16. Additional coding techniques will be brought out in the operational description.

It should be noted that the configurations described by FIGS. 2 and 6 are not the only circuits which will provide bipolar signals; many other printed configurations may be employed. For example, see FIG. 3. Staggered apertures and loops may also be used.

SOLENOIDS

(FIGS. 2 & 6)

The solenoids of the present invention may be of several types. The illustrated solenoids each have a single winding. The core material may be of air; however, some applications will be better served by employing a soft ferrite as the core material. In an actual operating system, the solenoids would be fixed at one end, possible potted in a base container, and free at the other end to facilitate easy memory plane removals and substitutions.

The solenoids of FIG. 2 have been referenced SOL since they are all sense solenoids. In FIG. 6 the drive solenoid have been additionally referenced as such (DSOL).

DESCRIPTION OF OPERATION

The following operational description is divided into two sections dealing with the directly driven type of memory and the connectionless card type of memory respectively.

Directly Driven Memory

Referring to FIGS. 1 and 2, a memory system of the directly driven, connected card type is shown. An associated machine or system (not shown) which utilizes this memory supplies a 12-bit input address 3 bits to select a word; 4 bits to select a driver; and 5 bits to select a switch. The system also supplies a READ signal which starts the reading process.

The READ signal, possibly a step input as seen in Trace A of FIG. 8, triggers a monostable multivibrator 730 in the timer 200 which provides a 1 microsecond pulse $L_r$. This pulse and its reciprocal $\overline{L}_r$ are coupled in amplifier form to the address register 100 and cause the outputs thereof to assume the conditions of the input address.

The address register 100 has outputs A through L as shown. Additionally, the outputs $\overline{A}$ through $\overline{L}$ are available, but not shown for the sake of clarity. These are indicated by the inversion markings or NAND gate 136.

The word select logic 125 decodes outputs A, $\overline{A}$ through C, $\overline{C}$ and furnishes control signals to the word selection circuits 170 to inhibit all bits except bits of the selected word via leads W1—W8.

The switch select logic 130 prepares a driving circuit for a selected driver via a particular memory plane by decoding address characters H, $\overline{H}$ through L, $\overline{L}$.

The driver select logic 135 decodes characters D, $\overline{D}$ through G, $\overline{G}$ upon receipt of the control signal $C_p$ from timer 200.

The pulse $L_r$ is transformed by delaying and shaping to a 0.5 microsecond pulse $C_p$ which enables the driver select logic, and thus, enables a selected driver from the plurality DR1—DR16. The selected driver provides a rectangular pulse through the major loop of the selected memory plane.

Referring to FIG. 2, a rectangular pulse traverses the major loop PC1 entering at terminal IT1 exits at terminal OT1 through the selected switch. As this signal traverses the series circuit of the major loop, including all of the minor loops ML thereof, signal transfers occur and corresponding flux changes are detected by the sense solenoids SOL. These flux changes will be sensed in one direction where a binary ONE is stored, and in an opposite direction where a binary ZERO is stored. For example, minor loop MLA encircles the corresponding sense solenoid on the right side thereof (as viewed from the terminal edge of card MP1, FIG. 2) so that this solenoid is excluded from the major loop; current flow in the minor loop encircles that solenoid in an anticlockwise direction; and magnetic field change is first directed in an upward (out of the drawing) direction. A signal indicating a binary ZERO will be transferred from minor loop MLA to the corresponding sense solenoid. Minor loop MLB encircles its corresponding solenoid on the other (left) side thereof; it thus is coded opposite to minor loop MLA and will have a corresponding first flux change with the associated field oriented downward. Since the printed circuit includes the corresponding sense solenoid within the major loop, a binary ONE signal will be transferred to the corresponding sense solenoid.

All bits sorted on a memory plane will be individually detected by the bit amplifiers 160. Preselection of a word was already accomplished by the word selection circuits 170 under the control of the decoding word select logic 125.

The data bits of the selected word are then individually sensed by the sense amplifiers 180 and presented as input signals to the output register 190.

The output register 190 operates in like manner to the address register 100. The output register is however controlled by signals $L_o$ and $\overline{L}_o$ of 0.2 microsecond width and approximately 1.05 microseconds after pulse $L_r$. Although timer 200 is not particularly a continuous running clock, this action is somewhat like a strobe; the output register is however operated to record the output signals upon receipt of $L_o$ and $\overline{L}_o$.

Solenoid Driven Memory

The connectionless card solenoid array memory operates very similar to the directly driven type memory just described. Therefore, only the major differences will be discussed herein.

Referring to FIG. 5, it can be seen that no switches or switch address and decoding equipment is utilized. This is because memory plane selection is fully accomplished by selection of a driver. For clarity, the same address characters are used where applicable. The illustrated connectionless card type memory is of smaller capacity having only 4 bits/word, 4 words/plane and only 16 planes to select. However, these figures are easily expandable; for example, the driving apparatus and its address can be increased and the number of bits/word and words/card can be increased.

The selection logic and decoding operates as before; also, the output side of the memory operates as before.

Of considerable interest is energization of a memory plane. Referring now to FIG. 6, assume that solenoid DSOLA is connected to a driver which has been enabled due to a particular input address. It can be seen that the drive section of the memory plane has its minor loops connected to the major loop in a tangential fashion. Since there is a correspondency of one drive solenoid to one memory plane, all but one minor loop must be conditioned or coded such that only that one solenoid and minor loop are inductively coupled. This can be accomplished to select memory plane CMP1 as follows:

1*a*. The selected minor loop is ruptured at its overlap with the major loop, the corresponding solenoid then being encircled and included within the major loop, 1*b*. all other loops of that drive row being ruptured at a substantially diametrically opposite point;

2. The series path of an unselected drive row is opened to eliminate that row in the conductive series path; and 3. If possible, a rupture of the printed circuit may exclude more than one drive row from the conductive series path.

The above is illustrated in FIG. 6 as follows:

A. Minor loop TMLA is ruptured at point TMLA' (1*a* above);

B. The other minor loops of that row are ruptured at points BL1 (1*b* above);

C. The printed circuit is opened at BL2, BL4 (2 above); and

D. The printed circuit is opened at BL3 (3 above).

Assuming now that solenoid DSOLA is energized, a signal transferred therefrom to the endless series circuit of the major loop CPC1 by way of TMLA causes a current flow therethrough. As this current traverses the major loop, it will encircle the sense solenoids, SOL via their corresponding minor loops, some of which are coded with a binary ONE and the others of which are coded with a binary ZERO. As previously related, the ONES and ZEROS are detected by the bit amplifiers 560. The system then operates the same as for the directly driven memory.

While the invention has been described in a specific illustration, many modifications and changes may be made by one skilled in the art without departing from the spirit and scope of the invention and should be included in the appended claims.

What I claim is:

1. A memory system comprising:
  a. a memory card including a substrate having a plurality of apertures therein defining bit positions;
  b. a plurality of elongated solenoids individually extending through the apertures;
  c. an electrical conductor printed on said substrate in one plane thereof:
  d. means to drive said electrical conductor;
  e. said conductor having a configuration such as to form a major loop, as well as a plurality of minor loop paths of mutually identical shape which are serially interposed in said major loop, each of certain ones of said minor loop paths representing a binary ONE and extending over substantially 180° around one side of the corresponding solenoid so that each said solenoid is included in said major loop and is inductively linked with the corresponding minor loop path to produce an effective output signal of one direction upon the driving of said electrical conductor, and each of certain others of said minor loop paths representing a binary ZERO and extending over substantially 180° around the opposite side of the corresponding solenoid so that each said last-mentioned solenoid is excluded from said major loop and is inductively linked with the corresponding minor loop to produce an effective output signal of the opposite direction upon the driving of said conductor, whereby a plurality of polarity-coded data words is represented on said plane of said memory card, with arbitrary polarity coding of all the individual bits of said word; and
  f. means responsive to said output signal of one direction to retrieve said binary ONES and responsive to said output signal of the opposite direction to retrieve said binary ZEROS.

2. Memory apparatus for storing a plurality of multibit data words comprising:
  a. a plurality of stacked data cards having a plurality of aligned apertures therein;
  b. a first plurality of elongated solenoids extending through some of the aligned apertures;
  c. an electrically conductive winding on each said data card linking an individual one of said first solenoids in inductive signal transfer relationship;
  d. a second plurality of elongated solenoids extending through others of the aligned apertures;
  e. a plurality of further electrically conductive windings on each said data card, some of said further windings individually linking some of said second solenoids in inductive signal transfer relationship of one sense and others of said further windings individually linking others of said second solenoids in inductive signal transfer relationship of an opposite sense, each said further winding representing a data bit;
  f. a bit transfer path on each said data plane comprising a series combination of said plurality of further windings and said first winding;
  g. means to selectively drive said first plurality of solenoids and thereby selectively energize a bit transfer path; and
  h. means connected to said second plurality of solenoids to sense opposite polarity signals induced therein.

3. Memory apparatus for storing a plurality of multibit data words comprising:
  a. a plurality of stacked data cards having a plurality of apertures aligned through the stack;
  b. an endless conductor printed on each said data card;
  c. a plurality of conductive drive loops printed on each said card and tangentially connected to said endless conductor, one of said drive loops on each said card being open at its point of tangency and the other drive loops on each said card being open at a point other than the point of tangency;
  d. a plurality of conductive sense loops printed on each said data card and connected in series by said endless conductor, some of said sense loops being open at one point thereof and others of said sense loops being open at a substantially opposite point thereof to respectively store opposite binary digits;
  e. a plurality of drive solenoids individually extending through the apertures corresponding to said plurality of drive loops, each said drive solenoid being associated with a separate data card and inductively linked in signal transfer relation with the said one drive loop thereof;
  f. a plurality of sense solenoids individually extending through the apertures corresponding to said plurality of sense loops and each inductively linked with its correspondingly aligned sense loops in signal transfer relation;
  g. means to drive a selected drive solenoid and thereby energize the corresponding endless conductor; and
  h. means connected to said plurality of sense solenoids to sense opposite polarity signals induced therein.

4. Memory apparatus according to claim 3, wherein said memory apparatus is provided with a read start signal, and further comprising timing means connected to said selective drive means and to said sensing means, said timing means adapted to receive said read start signal and operative responsive thereto to control the operations of driving and sensing in a predetermined time relation.

5. In a memory comprising a plurality of stacked memory cards, each including a substrate with a number of apertures therein defining bit positions, said apertures being aligned with corresponding apertures of other cards of the stack for receiving a number of elongated solenoids therethrough, and each said card having conductor means printed thereon, the improvement that said conductor means comprises a plurality of serially connected conductive strips printed on each said substrate so as to form a loop in a plane parallel to said substrate, each of at least predetermined ones of said conductive strips being of a width larger than the diameter of said solenoids, having apertures therein aligned with the apertures on said substrate and having at each of a first plurality of said apertures a discontinuity lengthwise of said strip, which extends between the corresponding aperture and one longitudinal edge of said strip, and having at each of a second plurality of apertures a discontinuity lengthwise of said strip, which extends between the corresponding aperture and the other longitudinal edge of said strip, so that each solenoid received by an aperture of said first plurality is included in said loop and is inductively linked with said conductor means for effective signal transfer in one sense, while each solenoid received by an aperture of said second plurality is excluded from said loop and is inductively linked with said conductor means for effective signal transfer in the opposite sense, whereby a polarity-coded data word is represented on said plane of said memory card, with arbitrary polarity coding of all the individual bits of said word.